Feb. 23, 1954  F. M. DARNER ET AL  2,670,423
AUTOMATIC SEAM FOLLOWING DEVICE FOR WELDING APPARATUS
Filed Jan. 16, 1951  4 Sheets-Sheet 4
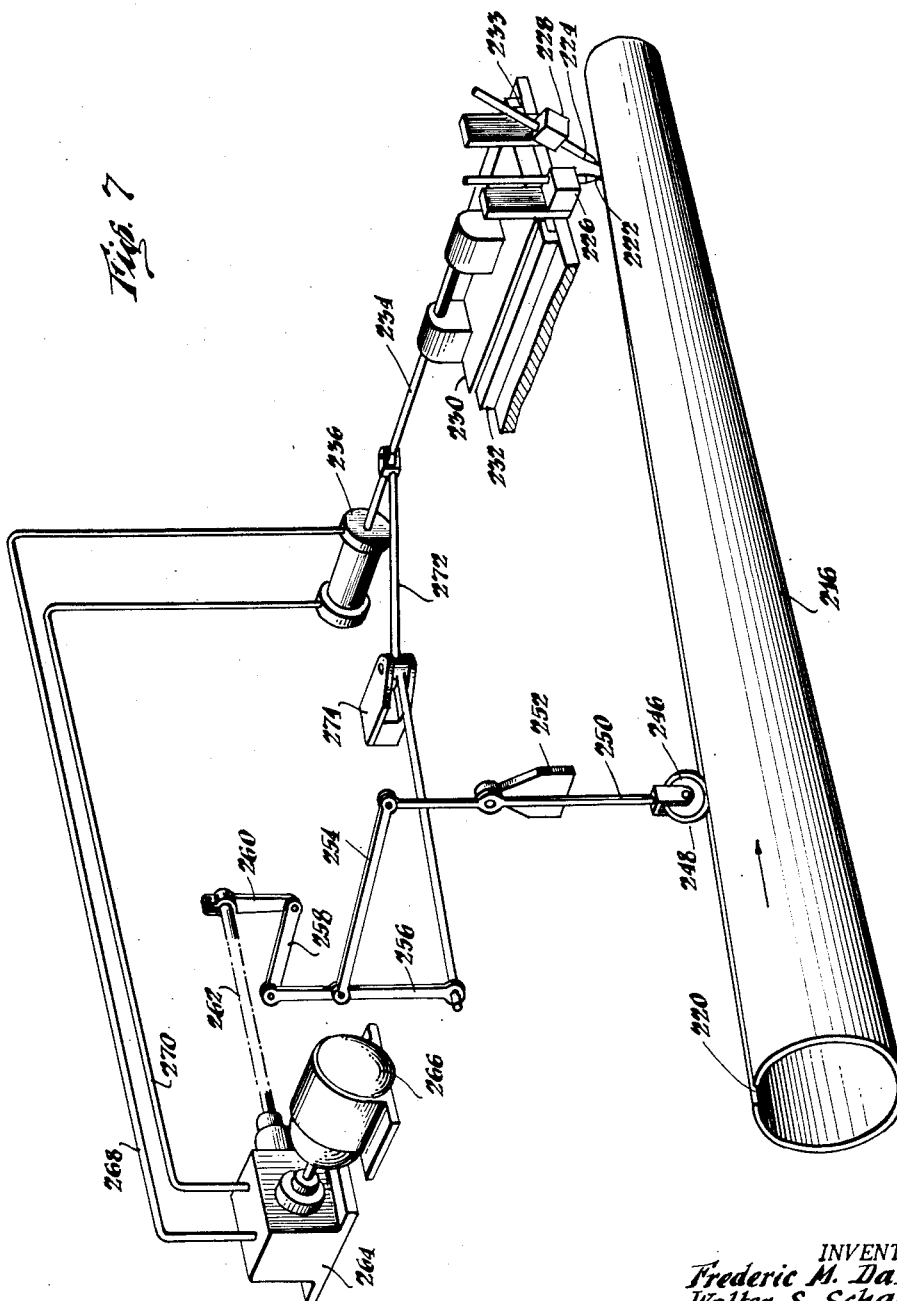
INVENTORS
Frederic M. Darner
BY Walter S. Schaeffer
Robert S. Dunham
ATTORNEY

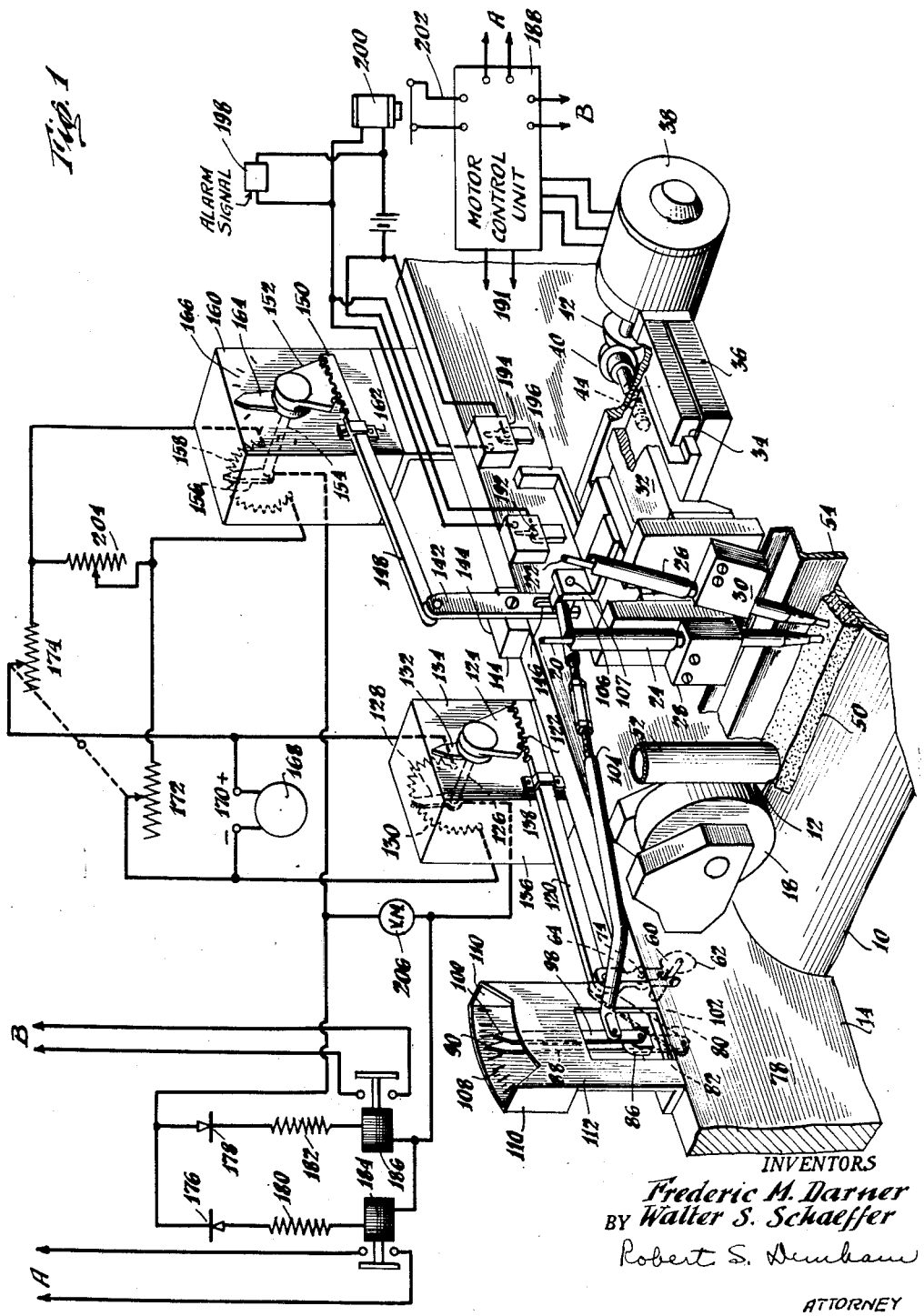

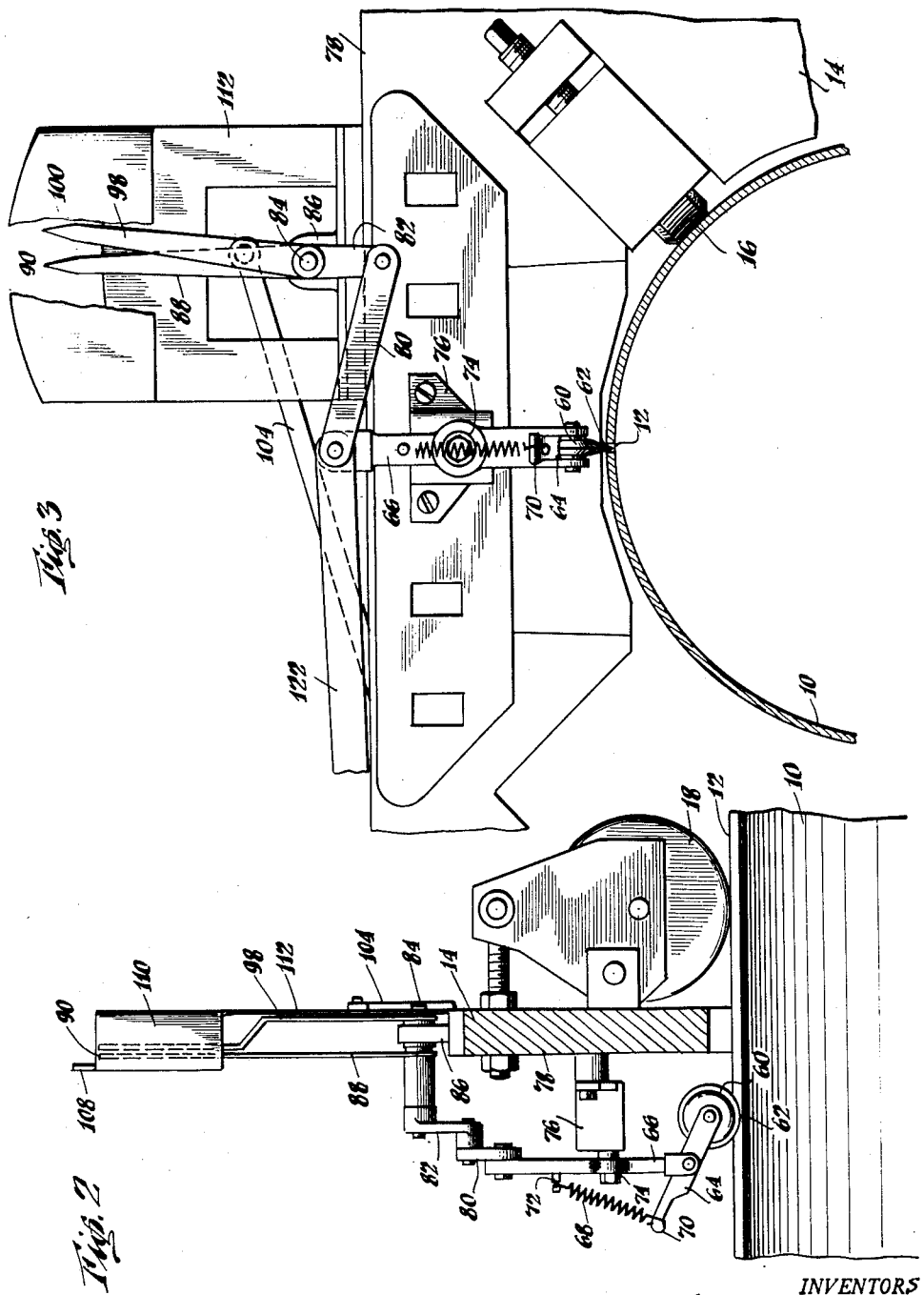

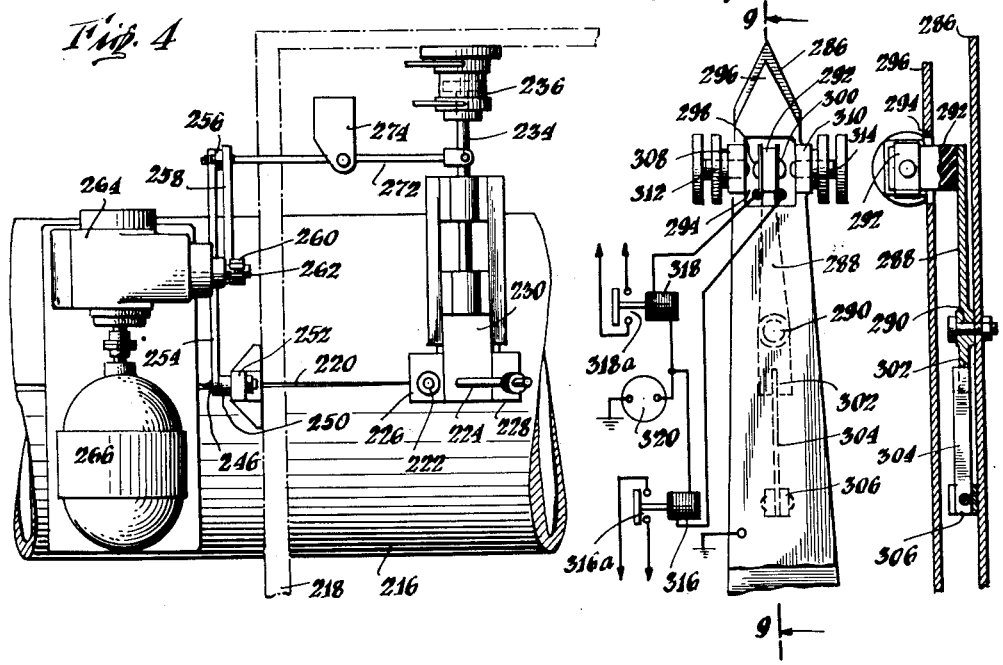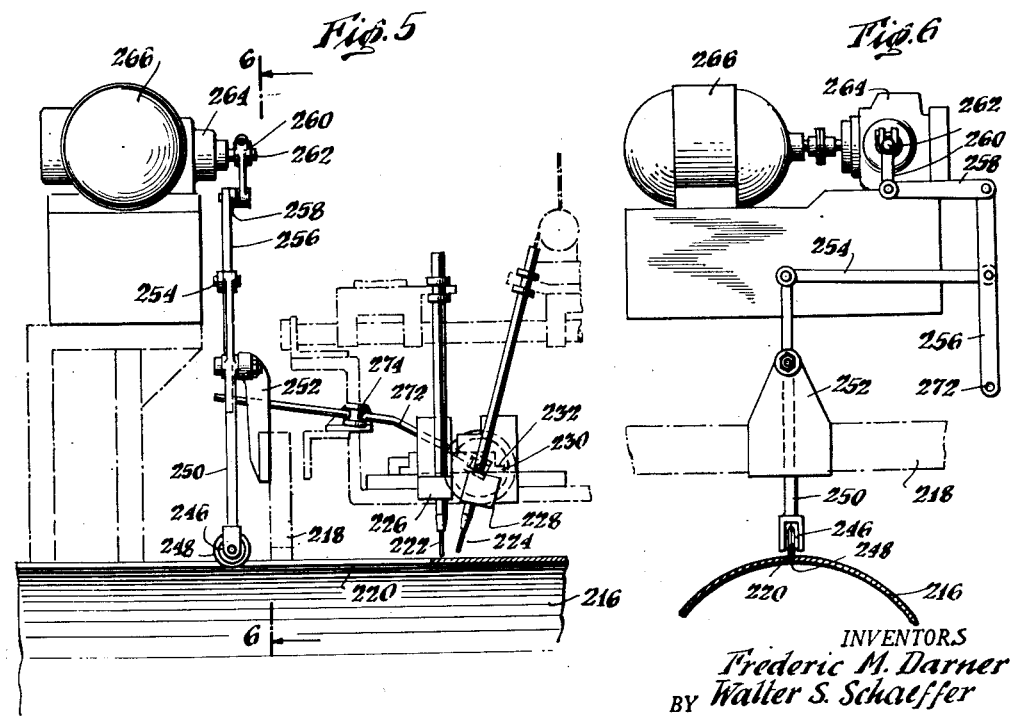

UNITED STATES PATENT OFFICE 2,670,423

AUTOMATIC SEAM FOLLOWING DEVICE
FOR WELDING APPARATUS

Frederic M. Darner, Shaker Heights, Ohio, and Walter S. Schaefer, East Gadsden, Ala., assignors to Republic Steel Corporation, Cleveland, Ohio, a corporation of New Jersey Application January 16, 1951, Serial No. 206,256

7 Claims. (Cl. 219—6)

This invention relates to automatic regulating instrumentalities for seam welding apparatus and more particularly to automatic regulating devices for apparatus utilized in the seam welding of pipe.

The invention is particularly adapted for pipemaking equipment wherein pipe (say 4 inches and upward in diameter) is produced by welding a seam along a longitudinal cleft in a tubular pipe blank which is continuously advanced past the welding means in an axial direction. Such apparatus involves a considerable assembly of cooperating devices for guiding, aligning and steadying the pipe blank during its passage to and through the welding station. The guiding and holding equipment preferably constitutes a chuck device having a multiplicity of rollers or the like for compressively engaging the pipe blank and holding it and particularly the edges of its cleft against any unwanted displacements while the seam is being welded.

A presently preferred type of welding operation involves one or more arc electrodes disposed adjacent the path of the cleft so that a welding arc is maintained between the electrodes and the edges of the cleft to produce the desired welded seam. In performing such operation a continuous layer of flux, e. g. loose, finely granular material, is deposited on the pipe blank, in bridging relation to the cleft, as the latter approaches the welding electrodes, so that the electrodes operate beneath the surface of the thick layer or heap of flux, which in turn remains over the seam until the welded portion of the pipe is advanced to a remote locality beyond the chuck.

By reason of the nature of the chuck device and the rollers and other instrumentalities surrounding the pipe blank therein, and also by reason of the employment of a rather wide band of flux covering the cleft and welded seam during practically the entire travel of the pipe blank through the chuck, it is usually impossible, or for any of these reasons at least difficult or inconvenient, for an attending operator to observe the line of the cleft or the produced seam as the latter is passing the welding electrodes. While the apparatus may also include means back of the chuck for guiding and aligning the cleft to present it with some accuracy along the path leading to the electrodes, experience has shown that some displacement or wandering of the welding of the cleft line is apt to occur, for example due to slight rotative distortion of the pipe blank from one place to another (such blanks being of the order of 30 feet in length) or by other circumferential displacement of the tubular article about its axis.

Although such positional variations may be relatively small, perhaps no more than a minor fraction of an inch, it is important that the welding electrode or electrodes be strictly aligned with the cleft for completeness and security of the welded seam, i. e. to position it exactly and symmetrically along the cleft.

In our copending application Serial No. 116,762, filed September 20, 1949, means were disclosed for providing an accurate amplified visual indication of the positional relation between the cleft and the welding electrodes, together with means for manually effecting a mutual adjustment therebetween. However, the embodiments therein disclosed require the attendance of an operator for the purposes of noting the departure from the predetermined positional relationship and for the further purpose of manually initiating a corrective positional adjustment.

The present invention may be briefly described as automatic regulating apparatus responsive to a departure from a predetermined alignment between the cleft and the welding electrodes for automatically effecting a corrective mutual adjustment of proper magnitude between the cleft line of the pipe and the welding electrodes, for example, by transverse adjustment of the latter relative to the former.

Accordingly, a chief object of the invention is to afford novel instrumentalities responsive to a departure from a predetermined positional relationship between the cleft line and the welding electrodes for automatically initiating a corrective adjustment to return said elements into the desired predetermined alignment.

Other objects are to afford new and improved automatic regulating means of the character described which are of a rugged nature and appropriate for heavy equipment such as used for manufacturing large diameter pipe.

Another object of this invention is to afford novel and sensitive automatic regulating devices that are responsive to relatively small departures from the predetermined positional relationship between the cleft line and the welding electrodes.

A further object of this invention is to provide automatic indicating devices of the character described that require little or no manual attendance and which dispense with the need for the manual initiation of corrective adjustments.

Other objects and advantages of the invention will be pointed out in the following disclosure and claims and illustrated in the accompanying drawings which disclose, by way of example, the principle of the invention and the presently preferred embodiments applying that principle.

Referring to the drawings:

Fig. 1 is a schematic perspective view of the control and regulating device;

Fig. 2 is a side elevational view, partially in section, of the cleft engaging device;

Fig. 3 is an end elevation of the cleft engaging device illustrated in Fig. 2;

Fig. 4 is a plan view of an alternative embodiment of the invention;

Fig. 5 is a side elevation of the embodiment illustrated in Fig. 4;

Fig. 6 is a section on the line 6—6 of Fig. 5;

Fig. 7 is a schematic simplified perspective view of the embodiment of the invention illustrated in Figs. 4, 5 and 6;

Fig. 8 is a plan view of another alternative embodiment of the invention; and

Fig. 9 is a section on the line 9—9 of Fig. 8.

Referring to Figs. 1, 2 and 3, the embodiment of the invention therein illustrated is shown in combination with apparatus through which a pipe blank 10, for example designed to produce pipe of large diameter (e. g. 20 to 30 inches or so), having a longitudinal cleft 12 is continuously advanced in the direction of its axis (as by means not shown), such apparatus comprising a chuck device generally designated 14. While the particular construction of the chuck 14 forms no part of the present invention and while many details of its structure are omitted from the drawings, it will be understood that it includes a multiplicity of sets of rollers, such as 16, the sets being distributed circumferentially around the passing pipe and each set including a multiplicity of rollers arranged in a linear array, i. e. lengthwise of the pipe blank, so that the latter is held, in compressive rolling engagement, at a great many points as it progresses through the chuck. A large register roller 18 may also be provided to bear against the upwardly disposed cleft, and in bridging relation thereto, as the pipe blank advances into the chuck.

The welding apparatus may include one or more welding electrodes, for example represented by the series of two wire electrodes 20, 22, having their lower ends disposed in close proximity to the cleft line to be welded and arranged in linear array along such path as shown. The electrodes 20, 22 consist of a suitable welding wire or rod and are adapted to be continuously fed, by means not shown, through sleeves 24, 26 and guide nozzle structures 28, 30 toward the welding locality.

The guide nozzle structures 28, 30 are mounted on a slide 32 horizontally movable in transverse ways, such as the way 34, that are in turn carried by a supporting plate 36 disposed above and at one side of the welding locality. Suitable means are provided for moving the slide 32 in a direction crosswise of the path of the pipe blank, such means being represented, for example, by a lead screw 44 coupled by bevel gears 40 and 42 to a drive motor 38.

A layer of suitable flux 50, say one or two inches deep, is continuously disposed on the pipe blank, from a flux supply conduit 52 disposed above the cleft line at a region to the rear of the arc electrode means, in the path of pipe travel. The resulting layer of solid, finely divided flux material is retained, e. g. in a path of desired width, by longitudinal shield plates, such as the shield plate 54. In consequence the electrodes 20, 22 plow continuously, so to speak, through the layer of flux, and the arcs struck between the electrodes and the work, as well as the seam line itself are buried beneath the mass of flux.

As also described in our copending application, Serial No. 116,762, a seam follower device is provided, including a seam following wheel 60 having a sharp circular edge 62 which slightly, but sufficiently, penetrates the crack, along the top of the pipe blank, constituted by the meeting edges of the cleft 12. The wheel 60 is thus designed for positive continuous engagement with the cleft as the latter, in essentially closed position, approaches the chuck. To roll along the cleft crack in this manner, the wheel 60 is mounted to turn on a horizontal axis at the end of an arm 64 which extends upwardly in a slanting direction and is pivoted, about a parallel axis, at the lower end of a lever arm 66. The arm 64 thereby rocking, as necessary, to accommodate irregularities, variations of level, and the like, encountered by the wheel 60. A coil spring 68 under tension between the opposite end 70 of the arm 64 and an upper point 72 of the vertical arm 66, urges the wheel 60 downward and keeps it firmly engaged in the cleft crack.

The vertical arm 66 is pivoted at a point 74, intermediate its ends, to swing about an axis parallel to that of the pipe, i. e. to rock crosswise of the latter, on a supporting bracket 76 carried by the heavy end plate 78 of the chuck assembly. The upper and opposite end of the arm 66 is connected by a transverse link 80 to a short crank arm 82 carried on a stub shaft 84 which is journalled or pivotally mounted on an upright support 86 secured at the top of the plate 78. The shaft 84 also carries a long upwardly projecting hand or pointer 88, which is thus adapted to swing (crosswise, above the pipe) as the shaft 84 is turned. In consequence of the described arrangement of levers and linkage, any transverse motion of the cleft seam following wheel 60 is transmitted and amplified into corresponding, larger transverse motion of the upper pointed end 90 of the pointer 88.

A similar hand or pointer 98 having a like upper pointed end 100 is pivotally mounted, but separate from the pointer 88, on the opposite or forward side of the support 86, i. e. so that the pointer 98 may swing about the same horizontal axis 102 (parallel to the pipe) as the pointer 88, but independently of the latter. At a locality shortly above its pivotal axis 102, the pointer 98 is connected by a long, crank shaped link 104 to an upright bracket 106 carried with the welding electrodes, the bracket being mounted, for example, on the slide 32 which supports the welding electrode nozzle guides 28 and 30. It will thus be seen that by virtue of the link connection 104 pivoted at its ends to the bracket 106 and the pointer 98, minute transverse displacements of the slide 32 and thus of the welding electrodes, are transmitted to the pointer 98 and are thus represented by correspondingly larger, i. e. amplified, displacements of the pointed end 100 thereof.

While the closely superimposed but upright moving pointers 88 and 98 afford a continuous visual indication of the relative positions of the seam cleft 12 and the welding means 20 and 22, and are eminently effective in providing an accurate visual indication of the positional relationship between the welding means and the advancing cleft, the structure shown also includes a stationary target or plate 108 disposed behind the pointers 88 and 98 as viewed from the welding electrodes 20 and 22. More particularly, the target 108 may consist of a vertical plate as shown, carried by ears 110 from a vertical shield plate 112 which is mounted upright on the end structure 78 of the chuck device. The shield plate 112 is cut away at the upper portions thereof so as to reveal the ends of the pointers 88 and 98 disposed in front of the plate 108. The latter may carry predetermined indicating graduations thereon for providing an easily observed comparative scale indicative of the degree of displacement of the welding electrodes relative to the cleft line.

The above described portions of the illustrated embodiment of the invention are similar to the structures disclosed in our above identified copending application.

Through the above described system of levers and linkages, the positioning of the pointer 88 is thus indicative of the position of the cleft 12 in the advancing pipe blank 10 and the positioning of the pointer 98 is indicative of the location of the welding means. The displacements of particular elements within the above described system of links and levers in response to displacements of the cleft 12 and the welding means are utilized to serve as an error detecting and indicating mechanism for the automatic regulating device forming the subject matter of this embodiment of the invention.

Pivotally mounted on the upper end of the arm 66 in the linkage system for the cleft engaging wheel 60 is a substantially horizontally disposed elongated link 120 terminating in a rack 122. The link 120 extends across the face of a resistance box 136 and is supported in sliding engagement therewith by suitable brackets 138, which however, do not impede the substantially horizontal movement of the rack 122 in response to rotational displacements of the arm 66. Meshing with the rack 122 and adapted to be rotationally displaced thereby is a sector 124 mounted on one end of a substantially horizontally disposed shaft 126 supported by the box 136. The other end of the shaft 126 supports a slide contactor 128 having its free end positioned in sliding contact with a resistance winding 130. An indicator arm 132 is mounted on the sector 124 and positioned in front of an indicating scale 134 on the front plate of the box 136 to provide a visual indication of the position of the slide contactor 128 on the resistance winding 130.

Through the above described linkage, a transverse displacement of the cleft engaging wheel 60 results in a rotational displacement of the slide contactor 128 on the resistance winding 130 in a direction in accordance with the direction of displacement of the cleft engaging wheel 60.

The mounting bracket 106 secured to the welding electrode slide 32, in addition to being connected to the pointer 98 through the crank 104 as described above, is connected to a substantially vertically disposed lever arm 142 pivotally mounted near its midpoint on a stub shaft mounted in block 144 which is supported by the end plate 78. To permit free pivotal movement of said lever arm 142 in response to transverse movement of the electrode slide 32, a stub shaft 107 secured to the bracket 106 rides in a vertically disposed slot 146 disposed in the lower portion of the lever arm 142. The upper end of the lever arm 142 is pivotally connected to a substantially horizontally disposed elongated link 148 terminating in a rack 150. The link 148 extends across the face of a second resistance box 160 and is supported in sliding engagement therewith by a suitable bracket 162 which, however, does not impede the substantially horizontal movement of said rack 150 in response to rotational displacements of the lever arm 142. Meshing with the rack 150 and adapted to be rotationally displaced thereby is a sector 152 mounted on one end of a substantially horizontally disposed shaft 154 supported by the box 160. The other end of the shaft 154 supports a slide contactor 156 having its free end positioned in sliding contact with a resistance winding 158. An indicator arm 164 is mounted on the sector 152 and positioned in front of an indicating scale 166 on the front plate of the box 160 to provide a visual indication of the position of the slide contactor 156 on the resistance winding 158.

Through the above described linkage, a transverse displacement of the electrode slide 32 results in a rotational displacement of the slide contactor 156 on the resistance winding 158 in a direction in accordance with the direction of displacement of the electrode slide 32.

The resistance windings 130 and 158 are connected in parallel across a suitable source of direct current power such as the generator 168 connected across the terminals 170 with suitable balance rheostats 172 and 174 connected in the lines between said resistance windings. The slide contactors 128 and 156 are electrically connected in series through an intermediate parallel circuit, one line of which includes the rectifier 176, the resistor 180 and the relay energizing coil 184 and the other line of which includes the rectifier 178, the resistor 182 and the relay energizing coil 186. The rectifiers 176, 178 are included in such a manner as to permit unidirectional oppositely directed current flow in each of said lines. The relay energizing coils 184 and 186 are adapted to actuate suitable circuit making and breaking contacts in the circuits identified by the letters "A" and "B" which form a part of a motor control unit 188 adapted to start and stop the motor 38 and to control the direction of rotation thereof.

In operation the balance rheostats 172 and 174 are manually adjusted to balance the circuit so that no voltage appears across either of the relay energizing coils 184 and 186 when the guide wheel 60 is seated in the cleft and the welding electrodes 20 and 22 are aligned, as by visual observation, with the cleft 12. This is conveniently performed prior to the start of operations by sighting through the exit end of the chuck 14 along the top of a pipe blank (preliminarily brought into the chuck) when there is no flux deposited on the seam and no weld being made. For convenience of adjustment, the shafts of the balance rheostats 172, 174 can be tied together as shown, so that the resistance in one line is increased while that in the other is decreased.

With the welding electrodes 20, 22 placed in the desired predetermined alignment with the cleft engaging wheel 60 and the balance rheostats 172 and 174 adjusted, as described above, the relay energizing coils 184 and 186 will be in a de-energized condition as no current is flowing in either line of the above described parallel circuit. A transverse displacement of the cleft engaging wheel 60 relative to the welding electrodes 20 and 22 results, through the linkage described above, in a rotational displacement of the slide contactor 128 on the resistance winding 130. The movement of the slide contactor 128 in response to the displacement of the cleft engaging wheel 60 unbalances the circuit and results in a potential appearing between the slide contactors 128 and 156, the polarity of which depends upon the direction of transverse displacement of the cleft engaging wheel 60. For example, if the cleft engaging wheel 60 is displaced to the left, as viewed in Fig. 1, the slide contactor 128 will be rotated in a counterclockwise direction. The counterclockwise rotation of the contactor 128 will result in making it negative with respect to the potential appearing on the contactor 156. The appearance of a potential difference between the slide contactors 128 and 156 results in a flow of current through either line of the parallel circuit, described above, positioned intermediate the contactors 128, 156, depending upon the polarity of the potential difference. In the example set forth above, current will flow through rectifier 178, resistor 182, and relay energizing coil 186. The flow of current through the coil 186 will energize it and will result in a closure of the relay contacts in the circuit "B." The completion of circuit "B" results in actuation of a motor starter (of conventional type, not shown) within the motor control device 188 to start the motor 38 rotating in a direction necessary to displace the slide 32 mounting the welding electrodes 20 and 22 to the left, as viewed in Fig. 1.

The flow of current through the rectifier 178 and the relay energizing coil 186 will continue until the slide contactor 156 is selectively displaced an amount sufficient to reduce the potential difference between the contactors 128 and 156 to zero which returns the circuit to its balanced condition. That is to say, the displacement of the welding electrodes 20, 22 to the left, through the above described selective actuation of the motor 38 results in a counterclockwise rotational displacement of the slide contactor 156 on the resistance winding 158. The rotational displacement of the contactor 156 continues until the potential difference between the slide contactors 128 and 156 is reduced to zero. When the potential difference becomes zero, the current flow through the rectifier 178 and relay energizing coil 186 ceases. The cessation of current flow deenergizes the coil 186 and opens the circuit "B" which stops the motor 38 and the system is once again balanced with the cleft and welding electrodes in alignment.

In the example set forth above the effect of a leftward transverse displacement of the cleft engaging wheel 60 was described in detail. If the cleft engaging wheel 60 is displaced to the right, as viewed in Fig. 1, the slide contactor 128 is rotated in a clockwise direction which makes the contactor 128 positive with respect to contactor 156. This potential difference results in a current flow through the rectifier 176, resistor 180 and relay energizing coil 184. The energization of the coil 184 results in closure of the associated contact points in the circuit "A." The completion of circuit "A" results in actuation of a motor starter (of conventional type, not shown) within the motor control device 188 to start motor 38 rotating in a direction necessary to displace the slide 32 to the right as viewed in Fig. 1. The displacement of the slide 32 to the right results in a clockwise rotational displacement of the contactor 156 which continues until the potential difference between the slide contactors 128 and 156 is reduced to zero. When the potential difference reaches zero, i. e. when the electrodes are once again aligned with the cleft, the flow of current ceases and the relay coil 184 is deenergized, so as to stop the motor 38.

Through the above described control system the register relationship between the cleft engaging wheel 60 and the electrodes 20 and 22 is maintained by displacing the electrodes 20 and 22 through a distance equal to the amount of displacement of the cleft engaging roll 60. The distance of travel of the slide 32 in response to any given displacement of the cleft engaging wheel 60 is controlled by the ratio rheostat 204 connected in parallel with the resistance winding 158. In practice, the amount of response displacement of the slide 32 is conveniently preadjusted, after initial alignment of the electrodes with the cleft engaging wheel 60, by moving the wheel 60 a measured and known distance away from the cleft 12. The movement of the electrode slide 32 in response to this predetermined displacement of the cleft engaging wheel 60 is noted and, if the distances are not equal, the ratio rheostat 204 is adjusted until the slide 32 moves exactly the same distance as the cleft engaging wheel 60. As will now be understood, such adjustments of the ratio rheostat effect a change in the voltage drop across the resistance 158 (and thus in the angular movement of the contactor 156 needed to balance a given potential difference in the control circuit), by changing the current flow through the circuit including the balance rheostats 172 and 174. Indeed after any substantial adjustment of the ratio rheostat 204 and consequent modification of the voltage drops in the balance rheostats, it may be necessary to readjust the latter for restoration of the proper relation between them, i. e. to maintain the desired positional correspondence, as well as equality of displacement, between the electrodes and the cleft wheel.

While any of a variety of values may be employed for the several electrical components in Fig. 1, i. e. as may be warranted by the actual conditions of power supply, use and the like, one satisfactory example of such a circuit was as follows: the generator 163 supplied D. C. at 110 volts. The resistors 130 and 158 were each 100 ohms, as likewise the total resistance of the ratio rheostat 204, while the full value of each of the balance rheostats was 25 ohms. 110-volt selenium rectifiers were used at 176, 178, in series with resistances 180, 182 of 5 ohms each, which served to limit the current to the sensitive relays, for protection of the latter. Each of the relay coils 184, 186 had a resistance of 25 ohms and was adapted to operate, i. e. to become energized sufficiently for a controlling operation of the relay contacts, upon a current of one milliampere.

If desired, time delay relays can be included in the motor control unit or suitably included in the circuits associated therewith, to continue operation of the motor 38 during the period when the current flow through either of the relay energizing coils 176, 178 is between zero and the minimum value required for energization thereof. Thus the motor will run for a second or so after the relay contacts open, and will restore the voltage of the control circuit to zero; whereas the relays are generally described above as opening their contacts when the voltage becomes zero, they will in practice so operate when the voltage reaches a minimum value near zero. The inclusion of time delay relays therefore assures a more accurate alignment of the cleft engaging wheel and the electrodes.

The pointer ends 98, 100 of the bands 88, 98 may serve to provide a continuous visual check of the positions of the cleft and arc electrodes relative to each other and to the chuck, but may in some cases be omitted, since a corresponding continuous indication can in effect be obtained by proper comparative observation of the indicator arms 132, 164 and scales 134, 166 associated with the contactors 128, 156.

To prevent the welding electrodes 20 and 22 from being displaced an excessive amount, e. g. sufficient to contact the flux shields, such as 54, a protecting device limiting the extent of displacement of the slide 32 is included in the apparatus. A pair of limit switches 192 and 194 are mounted on the plate 78 and are positioned so as to be operated by an arm 196 mounted on and moving together with the electrode slide 32. The limit switches 192, 194 are, for example, connected in circuit with a relay energizing coil 200 having its contact points included in circuit with one power lead of the motor 38 or with a stopping or arresting device (or with a holding circuit for the starting devices) within the motor control unit 188. An indicating device (e. g. a lamp or bell) schematically represented as 198, which may provide a visual or audible warning, is connected in parallel with the relay energizing coil 200 to provide an attention arresting indication of overrunning of the welding electrodes 20 and 22. If either of the limit switches 192, 194 is actuated to close the circuit, the alarm device 198 operates and the relay 200 is energized to open its normally closed contacts and stop the motor. The above described circuit thus prevents the electrodes 20 and 22 from being displaced beyond predetermined limits and thus prevents electrode damage occasioned by running into adjacent parts such as the flux shields 54 disposed on either side of the weld.

The above described protective system is desirable for most conditions of service, because the cleft engaging wheel 60 occasionally does become squeezed outside of the seam by lapping of the edges of the latter, or by a mismatched end joint between successive pipe blanks, which causes the roller to run outside of the limiting band of welding.

With the specific circuit disclosed in the apparatus of Fig. 1, the mechanical lever system for rotating the slide contactor 156, i. e. lever 142, arm 148 and gearing 150—152, must be such (relative to the system for tuning the contactor 128) that the contactor 156 will rotate appreciably more, for instance nearly 50% more, for a predetermined displacement of the welding electrodes than is required of the contactor 128 for the same predetermined displacement of the cleft wheel 60. This amplified rotation is necessary because the effect of the balance and ratio rheostats 172, 174 and 204 is to produce a voltage drop which reduces the potential appearing across the resistance winding 158 to less than the potential appearing across the resistance winding 130. Therefore, a larger rotative displacement of slide contactor 156 is required to balance the potential difference created by displacement of the contactor 128. As indicated above ultimate precision of balance, so that the arc follows exactly every displacement of the cleft wheel 60, is then readily achieved by preliminary adjustment of the ratio rheostat 204.

Figs. 4, 5, 6 and 7 illustrate another and hydraulically operable embodiment of the invention. This embodiment is shown in combination with apparatus through which a pipe blank 216 having a longitudinal cleft 220 is continuously advanced in the direction of its axis, such apparatus comprising a chuck device generally designated 218 and similar in construction to the chuck device 14 of Figs. 1, 2 and 3. It will be appreciated that in the schematic view of Fig. 7, the dimensions and spacing of various parts and objects have been exaggerated or disproportionately reduced, for clarity.

The welding apparatus may include one or more welding electrodes represented in the drawings as the two wire electrodes 222 and 224 having their lower ends disposed in close proximity to the cleft line to be welded and arranged in a linear array along such path, as shown. The welding electrodes 222 and 224 are supported in suitable guide nozzle structures 226 and 228 which are in turn mounted on a slide 230 horizontally displaceable in transverse ways 232, 233. The slide 230 is connected to the free end of a piston rod 234 horizontally displaceable in both directions by the action of a hydraulically operable cylinder 236.

Positioned within the cleft 220 is a seam following wheel 246 having a sharp circular edge 248 which slightly, but sufficiently, penetrates the crack along the top of the pipe blank 216 constituting the meeting edges of the cleft 220. The wheel 246 is thus designed for positive continuous engagement with the cleft as the latter, in essentially closed position, approaches the chuck 218. To roll along and within the cleft in this manner the wheel 246 is mounted to turn on a horizontal axis at the end of a vertically disposed arm 250 which is pivotally mounted at a location above its midlength on a mounting bracket 252 secured to a portion of the chuck device 218, the arm 250 thereby rocking about its pivotal mounting in response to transverse displacements of the wheel 246. It will be understood that the wheel can, if desired, be carried by a separate arm and spring like the elements 64, 68 of Fig. 2, so as to permit some freedom of vertical motion.

The upper end of the arm 250 is connected to one end of a transverse link 254. The other end of the transverse link is connected to a vertically disposed link 256 at a location above its midlength. The link 256 is thereby adapted to be pivotally displaced or rocked about its lower end in response to transverse displacements of the link 254. The upper end of the vertical link 256 is connected to one end of a lever arm 260 through an intermediate transverse link 258. The other end of the lever arm 260 is secured to a valve actuating shaft 262 of a hydraulic pump 264 operated by a suitable motor 266. The hydraulic pump 264 is connected by suitable hydraulic lines 268 and 270 to the hydraulic cylinder 236 described above. The lower end of the vertical link 256 is connected to a point on the piston rod 234 by an extended crank 272 pivoted in the vicinity of its midlength as at 274.

Since the cylinder 236 and the pump 264 with its drive motor 266 may be of conventional construction, details of these devices, including the control valve operated by the shaft 262, are not shown, but their arrangement is conveniently such that when the valve shaft is turned one way, the pump operates to deliver liquid under pressure through one of the conduits 268, 270 while withdrawal of fluid is effected or permitted through the other, the piston in the cylinder 236 being correspondingly set in motion. Restoring the valve interrupts the drive of the piston. In like fashion, by effecting flow in opposite direction through the lines 268, 270, rotation of the valve shaft to and from a reverse position starts and stops the displacement of the piston in the reverse direction.

A displacement of the cleft 220 to the left, as viewed in the direction of the arrow of Fig. 7 (that also shows the direction of pipe travel), results in a pivoting of the arm 250 clockwise about the supporting bracket 252. The pivotal displacement of the arm 250, through the linkage including the links 254, 256 and 258, results in a counterclockwise rotational movement of the lever arm 260 and the valve shaft 262, i. e. as seen in the same direction of the arrow of Fig. 7. The counterclockwise displacement of the valve shaft 262 actuates a conventional control valve contained within the pump 264 (as explained above) which selectively directs a flow of hydraulic fluid through the line 268 to the cylinder 236. The actuation of the cylinder 236 by flow of hydraulic fluid through the line 268 results in a leftward transverse displacement of said piston rod 234 which displaces the welding electrodes 222 and 224 to the left. The leftward displacement of the piston rod 234, as described above, levers the extended crank 272 about its fulcrum 274 and pivotally displaces the lower end of the link 256 to the right about its pivotal connection with the transverse link 254. This pivotal movement of the link 256 results in a clockwise rotational displacement of the lever arm 260 which correspondingly turns the valve shaft 262 to return the internally disposed valve to its original neutral position. The clockwise rotation of the valve shaft 262 in response to the displacement of the piston rod 234 thus halts the flow of hydraulic fluid to the cylinder 236 through the line 268 after the system has been re-aligned.

If the cleft wheel 246 is moved transversely to the right, as viewed from the direction of the arrow of Fig. 7, clockwise rotational displacement of the lever arm 260 and the valve shaft 262 results. The clockwise rotational movement of the shaft 262, away from neutral position, actuates the above mentioned valve contained within the pump 264 which selectively directs the flow of hydraulic fluid through the line 270 to the hydraulically operable cylinder 236. The actuation of the cylinder 236 by the flow of hydraulic fluid through the line 270 results in a displacement of the piston rod 234 and the electrode slide 230 to the right, thus again causing the electrodes to follow the position of the wheel 246. The motion of the piston rod 234 to the right also levers the crank 272 about its pivotal mounting 274 and pivotally displaces the lower end of the link 256 to the left about its pivotal connection with its transverse link 254. This pivotal movement of the link 256 results in a counterclockwise rotational displacement of the lever arm 260 and valve shaft 202 which returns the internally disposed valve to its neutral position and halts the flow of hydraulic fluid in the line 270 after the system has been re-aligned.

A third embodiment of the invention is illustrated in Figs. 8 and 9 and may generally be described as an electrical switching system associated with and responsive to the movement of indicating pointers such as the pointers 88 and 98 described above in conjunction with the embodiment illustrated in Figs. 1, 2 and 3. As there described, and, as also described in our above identified copending application, a dual pointer system, i. e. the pointers 88 and 98, was provided to visually indicate at a single location the relative positional relationship between the cleft and the welding electrodes.

In the embodiment illustrated in Figs. 8 and 9, the rear indicating pointer 286, responsive to the position of the cleft and actuated by a suitable cleft-following wheel and linkage as described above in conjunction with Figs. 1, 2 and 3 has a switching member 288 which is pivotally mounted thereon at 290 and has a block 292 mounted on its upper end. The block 292 is sized to project through a rectangular aperture 294 in the front pointer 296, which is displaceably responsive to the position of the welding electrodes through a lever and linkage system as described above in conjunction with Figs. 1, 2 and 3. The block 292 is preferably formed of insulating material and carries separately wired electrical contact points 298 and 300 disposed in alignment on the opposite faces thereof.

The lower end of the switching member 288, i. e. the portion disposed below the pivotal mounting 290, is provided with a vertical slot 302 encompassing the free upper end of a flat spring member 304 which has its lower end rigidly mounted in a block 306. The front pointer 296 is provided with blocks 308 and 310 disposed on either side of the aperture 294 and positioned adjacent the faces of the block 292. The blocks 308 and 310 provide a mount for the contact tipped screws 312 and 314 positioned in alignment with the previously mentioned contact points 298 and 300 on the block 292. The contact tipped screws 312 and 314 are preferably adjustably positioned so as to facilitate the maintenance of a predetermined gap between the adjacent electrical contacts when the welding electrodes and the cleft following wheel are positioned in the desired predetermined alignment, i. e. when the pointers 286, 296 are in alignment.

In operation any transverse displacement of the cleft in the pipe blank being welded results in an amplified displacement of the rear pointer 286 through the earlier described linkage associated therewith. The displacement of the pointer 286 relative to the pointer 296 (which remains fixed in position during the displacement of the pointer 286) effects the closure of one set of the above described contact points in accordance with the direction of displacement of the cleft. The closure of either set of contact points results in the selective energization of either of the parallel relay energizing coils 316 and 318 which are connected in series with a suitable source of power such as the direct current generator 320. The selective energization of the relay coil 316 or 318 results in closure of contact 316a or 318a which may be conveniently included in circuit with a motor control unit controlling the starting and direction of rotation of a suitable motor for transversely displacing the welding electrodes, such as the motor control unit 188 and motor 38 described above in conjunction with the embodiment of the invention illustrated in Figs. 1, 2 and 3.

For example, a displacement of the cleft to the right as viewed in Fig. 1 causes closure of the points 300 and 314. The closure of the points 300 and 314 completes the circuit for the relay energizing coil 316 and results in the energization of that coil. When the coil 316 is energized, a circuit is completed to a motor control unit, such as that described above in conjunction with Figs. 1, 2 and 3, to selectively initiate rotation of a drive motor for displacement of the electrode slide to the right. The rightward displacement of the electrode slide in response to the above described displacement of the cleft results in a rightward displacement of the front pointer 296. The displacement of said pointer 296 continues until the welding electrodes are realigned with the previously displaced cleft and the contacts 300 and 314 are broken, whereupon the control circuit is deenergized to halt the displacement of the electrodes.

In a similar manner a displacement of the seam to the left will cause the contacts 298 and 312 to close, energizing the relay energizing coil 318 and selectively operating the slide displacing motor in a direction necessary to move the electrode slide to the left to bring the electrodes into realignment with the previously displaced cleft.

If desired, time delay relays, not shown in the drawings, may be conveniently included in the motor control unit and motor circuits to prolong the operation of the electrode slide motor, so as to bring the pointers more nearly into exact alignment after each re-positioning of the slide, and to assure a clean break of the contact points.

In operation, it will usually be found undesirable to displace the electrodes too rapidly in response to displacement of the cleft. Unduly rapid movement of the electrodes often results in an objectionably sinuous or snaky looking weld. The speed of the electrode slide drive motor should be suitably controlled, e. g. so as to choose the most desirable and usually rather slow speed of electrode displacement. If for a short period the seam may move at a somewhat faster rate than the described relatively slow rate at which the electrode drive simultaneously endeavors to follow up, the switching member 288 will rock and under the action of the spring 304 will keep the electrical contact points closed (without strain or damage of the mechanism) until the electrodes are once again positioned in their predetermined alignment with the cleft. It will be understood that suitable safety devices, such as the limit switches 192, 194 of Fig. 1 and the arrangements under their control, may be included in this as well as other forms of the invention, to keep the electrode structure within desired bounds when the cleft wheel deviates excessively.

All of the above described automatic regulating instrumentalities may be of relatively rugged and durable construction, not easily susceptible of damage or of impairment of fidelity of response, and yet will be extremely sensitive in operation. The system is adapted for easy and simple adjustment, and yet at the same time very accurately and reliably serves the desired purpose of providing automatic registration between the welding means and the cleft in the pipe blank.

It is to be understood that the invention is not limited to the specific apparatus herein illustrated and described, but may be embodied in other forms without departure from its spirit.

What is claimed is:

1. In apparatus for manufacturing pipe from a tubular blank having a longitudinal cleft, a stationary welding chuck through which said blank is advanced axially, a welding device mounted on said chuck for movement transverse to the path of advancement of the blank and operable when aligned with said cleft to close the cleft by welding a seam along it as the blank advances, reversible motor means for driving said device transversely of said path, a device engaging the cleft as it approaches the welding device, said cleft engaging device being mounted on said chuck and movable transversely of the path of advancement of the blank to follow variations in the lateral position of the cleft; a first control element, means connecting said control element to said cleft engaging device for concurrent movement therewith, said connecting means including means for amplifying the movement of said control element proportionally to the transverse movement of the cleft engaging device; a second control element, means connecting said second control element to said welding device for concurrent movement therewith, said last-mentioned connecting means including means for amplifying the movement of said second control element proportionally to the transverse movement of said welding device, said second control element having a normal positional relationship relative to said first control element indicative of alignment of the welding device with the cleft, means operatively connected to said control elements and responsive to the relative positions thereof for controlling said motor means, said motor controlling means being effective upon displacement of said first control element from said normal positional relationship to cause operation of said motor means in a direction to drive said welding device back into alignment with the cleft and thereby to move said second control element to restore said normal positional relationship.

2. In apparatus for manufacturing pipe from a tubular blank having a longitudinal cleft, a stationary welding chuck through which said blank is advanced axially, a welding device mounted on said chuck for movement transverse to the path of advancement of the blank and operable when aligned with said cleft to close the cleft by welding a seam along it as the blank advances, reversible motor means for driving said device transversely of said path, a device engaging the cleft as it approaches the welding device, said cleft-engaging device being mounted on said chuck and movable transversely of the path of advancement of the blank to follow variations in the lateral position of the cleft; a first lever having an arm operatively connected to said cleft engaging device for movement of the lever concurrently with and proportionally to the transverse movement of the cleft engaging device; a second lever having an arm operatively connected to said welding device for movement of the second lever concurrently with and proportionally to the transverse movement of said welding device, said second lever having a normal positional relationship relative to said first lever indicative of alignment of the welding device with the cleft, motor control means connected to said levers at points spaced from the connections of said devices to said levers, said motor control means being responsive to the relative positions of the levers and operatively connected to said motor means, said motor controlling means being effective upon displacement of said first lever from said normal positional relationship to cause operation of said motor means in a direction to move said welding device back into alignment with the cleft and thereby to move said second lever to restore said normal positional relationship.

3. Apparatus for manufacturing pipe as defined in claim 2, in which said motor means is electrical; and said motor controlling means comprises two movable contacts, means operatively connecting each of said contacts to one of said levers, and electrical circuit means controlled by said contacts, and effective to energize said motor means in accordance with the relative positions of said contacts.

4. Apparatus for manufacturing pipe as defined in claim 3, including a balanceable electrical network, first and second variable impedance means electrically connected in said network and effective when varied to change the condition of balance of said network, each of said contacts being effective when moved to vary one of said impedance means, said motor means being electrical and said motor controlling means comprising relay means responsive to unbalance of said network for energizing said motor means for operation in a direction dependent upon the sense of unbalance of the network, said motor operation being effective to move one of said contacts to rebalance said network.

5. Apparatus for manufacturing pipe as defined in claim 4, including variable impedance means connected in said network for adjusting the ratio between a controlling movement of said cleft engaging device and the responsive movement of said welding device by said motor means.

6. Apparatus for manufacturing pipe as defined in claim 2, including means for adjusting said normal positional relationship.

7. Apparatus for manufacturing pipe as defined in claim 2, in which said motor means is hydraulic; and said motor controlling means comprises conduits for the supply and discharge of fluid to and from said motor means, valve means controlling said conduits, and a floating lever operatively connected at spaced points to said first and second levers and to said valve means.

FREDERIC M. DARNER.
WALTER S. SCHAEFER.

References Cited in the file of this patent
UNITED STATES PATENTS

| Number | Name | Date |
|---|---|---|
| 1,983,930 | Carlsen | Dec. 11, 1934 |
| 2,061,671 | Reimenschneider | Nov. 24, 1936 |
| 2,132,960 | Montrose-Oster | Oct. 11, 1938 |
| 2,136,695 | Laing | Nov. 15, 1938 |
| 2,189,399 | Lewbers | Feb. 6, 1940 |
| 2,548,599 | Garr | Apr. 10, 1951 |